US006095429A

United States Patent [19]

Killgrove et al.

[11] Patent Number: 6,095,429

[45] Date of Patent: Aug. 1, 2000

[54] WHEELED FIRE HYDRANT DIFFUSER

[76] Inventors: Jack G. Killgrove, P.O. Box 1145, Lady Lake, Fla. 32158; John Kiley, 33822 Picciola Dr., Fruitland Park, Fla. 34731

[21] Appl. No.: 09/231,330

[22] Filed: Jan. 13, 1999

[51] Int. Cl.[7] .......................... A01G 25/09; B65H 75/00; B05B 1/26; B05B 15/06

[52] U.S. Cl. .......................... 239/172; 239/279; 239/195; 239/499

[58] Field of Search .................................... 239/195, 197, 239/198, 499, 279, 289, 172; 137/565.17, 355.12

[56] References Cited

U.S. PATENT DOCUMENTS 4,047,668 9/1977 DeWeese et al. ........................ 239/504
4,343,435 8/1982 Anderton et al. ........................ 239/504

*Primary Examiner*—Andres Kashnikow
*Assistant Examiner*—Davis Hwu
*Attorney, Agent, or Firm*—William M. Hobby, III

[57] ABSTRACT

A wheeled fire hydrant diffuser has a wheeled frame having a trailering tongue for attachment to the rear of a towing vehicle. The housing is formed with walls and attached to the wheeled frame and has an inner chamber therein having an open bottom. An elongated walled passageway extends through the housing chamber and has an opening therein facing the top of the housing. A flexible fire hose is attached to a coupling in the walled passageway and has a removable fire hydrant coupling on the other end thereof so that the fire hose can be connected to the fire hydrant and the fire hydrant opened to direct water therefrom through the walled passageway into the housing inner chamber and out the bottom of the housing inner chamber. The housing has a storage compartment for storing the flexible fire hose.

7 Claims, 2 Drawing Sheets

WHEELED FIRE HYDRANT DIFFUSER

BACKGROUND OF THE INVENTION

The present invention relates to a fire hydrant diffuser and especially to a fire hydrant diffuser on a wheeled frame for towing behind a vehicle.

Fire departments periodically open the fluid flow from a fire hydrant so as to ascertain that the water pressure is at a predetermined minimum amount required to fight fires and to clean out the water lines. Typically, a fire truck will drive up to each fire hydrant and turn on each hydrant to flush out the water lines and hydrant as well as to measure the water pressure at the hydrant. During this procedure, it has been found that the water flow exiting the hydrant can cause damages to objects, such as vehicles or to the surrounding landscape or housing adjacent the hydrant and to the streets and sidewalks. Thus, it becomes desirable to provide a fire hydrant diffuser which effectively interrupts a high pressure stream of water when cleaning out water lines and fire hydrants to reduce damaging effects from the high pressure stream of water.

One prior U.S. patent which considered this problem is U.S. Pat. No. 4,343,435 to Anderton, et al. for a fire hydrant diffuser having a flared housing rectangular in cross section with a pair of water diffusing members in an opposed relation angled to form a V-configuration and having a stepped mesh structure positioned relative to the direction of flow of water to present narrow obstructing slits for the passage of the water. In the U.S. Pat. No. 4,047,668 to DeWeese, a water hydrant diffuser is provided which can be connected to a water hydrant when the fluid flow from the water hydrant is being measured. The water hydrant diffuser is formed of a plurality of diffuser elements mounted in generally parallel planes in a housing and has a coupling for securing to a water hydrant outlet. A fluid flow measuring device can be inserted in the water hydrant diffuser intermediate the coupling section free end and the diffuser element. In the U.S. Pat. No. 4,756,497 to Lazenby, a flush type fire hydrant is provided for use in purging water lines of a water system which have become contaminated. In the U.S. Pat. No. 5,201,338 to McKeague, a water distribution system includes flushing hydrants having buried valve assemblies and a removable top stock carried from valve assembly to valve assembly. In the U.S. Pat. No. 4,651,772 to Carlin, a delay valve is attached to a fire hydrant and interposed between the hydrant and the hose and restricts the high flow and high pressure of the hydrant to a small fraction of the normal flow and pressure until the hose is filled up, at which point the valve opens fully so that the hose and hydrant are fully operational.

The present invention, in contrast, is for a wheeled fire hydrant diffuser which can be attached to a vehicle, such as an automobile or small pickup truck, to avoid the use of expensive fire trucks and crews for flushing fire hydrants. This allows a much less expensive vehicle, such as a pickup truck, and one individual to go from fire hydrant to fire hydrant flushing each fire hydrant and thus reducing the cost of maintaining the fire hydrant. The fire hydrant diffuser effectively interrupts a high pressure stream of water which avoids the damage to vehicles, landscape and streets in testing fire hydrants and, at the same time, reduces the time and personnel and equipment involved in flushing a municipality's fire hydrant.

SUMMARY OF THE INVENTION

A wheeled fire hydrant diffuser has a wheeled frame having a trailering tongue for attachment to the rear of a towing vehicle. The housing is formed with walls and attached to the wheeled frame and has an inner chamber therein having an open bottom. An elongated walled passageway extends through the housing chamber and has an opening therein facing a wall of the housing. A flexible fire hose is attached to a coupling in the walled passageway and has a removable fire hydrant coupling on the other end thereof so that the fire hose can be connected to the fire hydrant and the fire hydrant opened to direct water therefrom through the walled passageway into the housing inner chamber and out the bottom of the housing inner chamber. The housing has a storage compartment for storing the flexible fire hose.

BRIEF DESCRIPTION OF THE DRAWINGS

Other objects, features, and advantages of the present invention will be apparent from the written description and the drawings in which.

DESCRIPTION THE PREFERRED EMBODIMENT

Figures 1, 2:
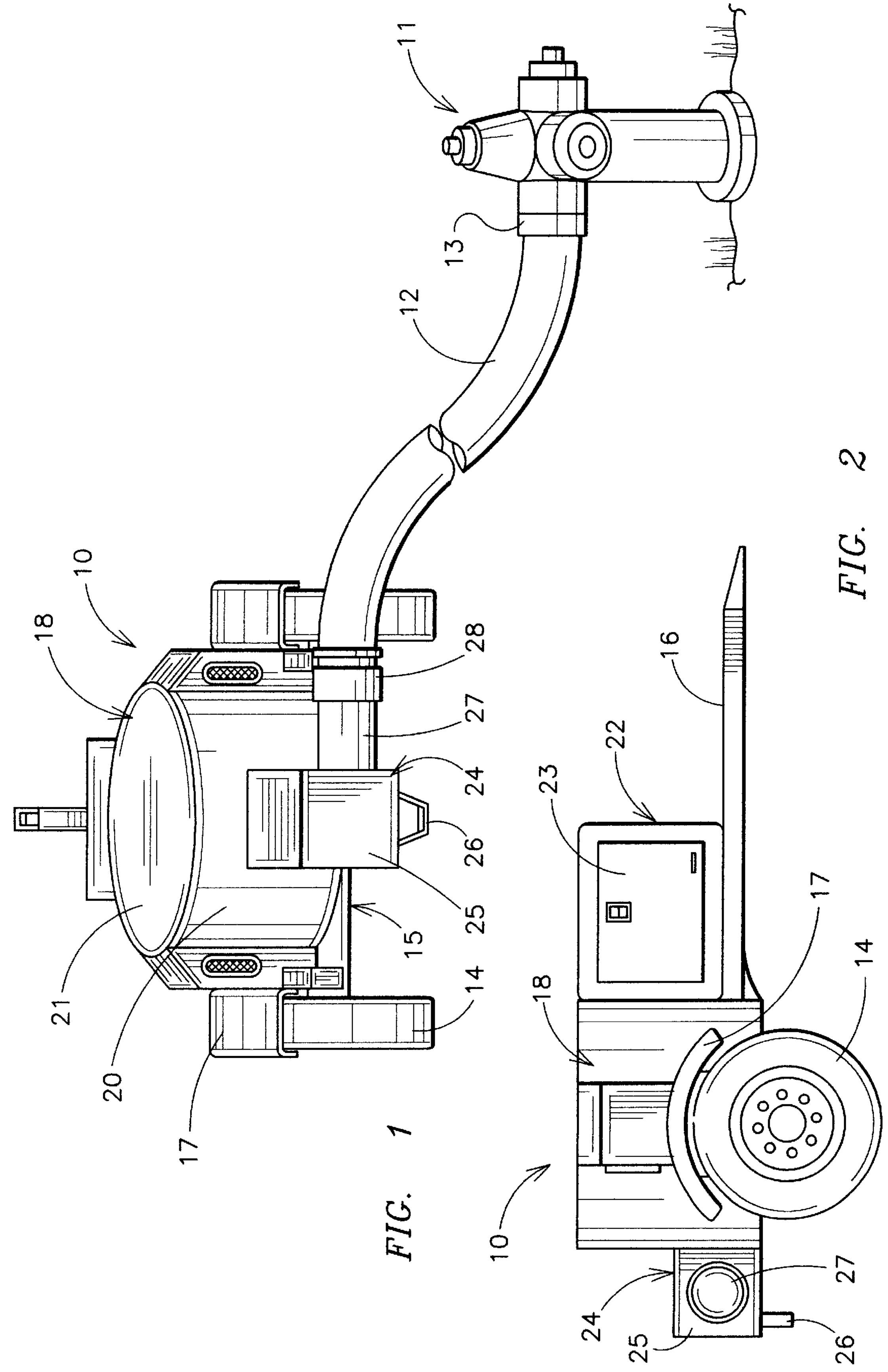
FIG. 1 is a perspective view of a wheeled fire hydrant diffuser in accordance with the present invention connected to a fire hydrant.
FIG. 2 is a side elevation of the fire hydrant of FIG. 1.

Referring to FIGS. 1–5 of the drawings, a wheeled fire hydrant diffuser 10 is shown connected to a fire hydrant 11 in FIG. 1 with a flexible fire hose 12. The hose 12 has a fire hydrant coupling 13 on one end thereof connected to the fire hydrant 11. The fire hydrant diffuser 10 has a pair of wheels 14 connected to a frame 15 which includes the axle and a trailer tongue 16 extending from the front of the diffuser 10. The wheels 14 have covers 17. A diffuser housing 18 is mounted to the frame 15 supported by the wheels 14 and has a generally cylindrical walled portion 20 having a flat top 21. The housing also includes a storage compartment 22 having a hinged door 23 thereon for storing the flexible fire hose 12 when the fire hydrant diffuser 10 is being trailered between locations. A walled passageway 24 extends through the housing 18 and has a protruding portion 25 protruding from the rear of the fire hydrant diffuser 10. The protruding portion has a foot 26 and a fire hose coupling 27 extending from one side thereof for coupling the fire hose 12 thereto with a hose coupling member 28.

Figure 3:
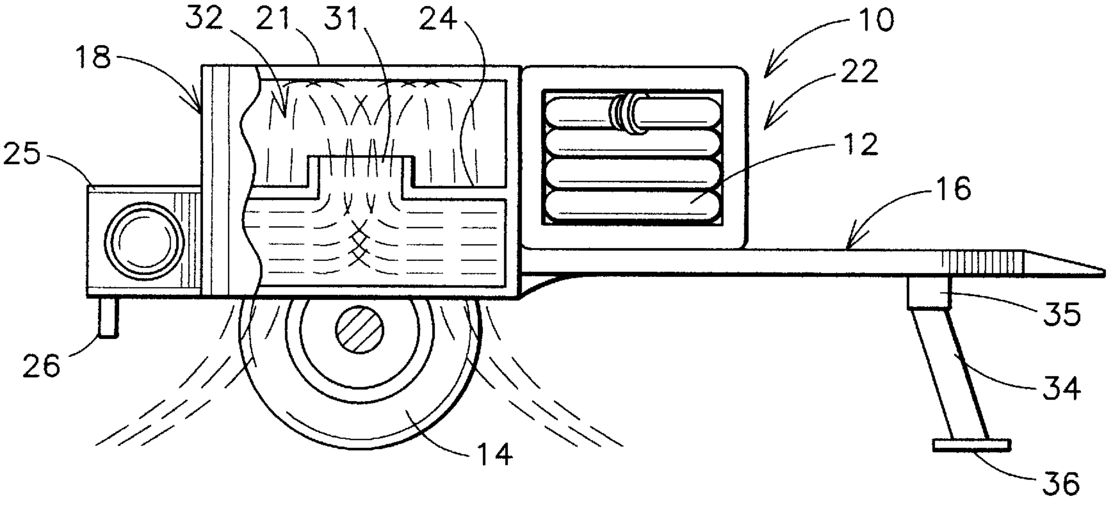
FIG. 3 is a sectional view taken through the fire hydrant diffuser of FIGS. 1 and 2.
Figure 4:
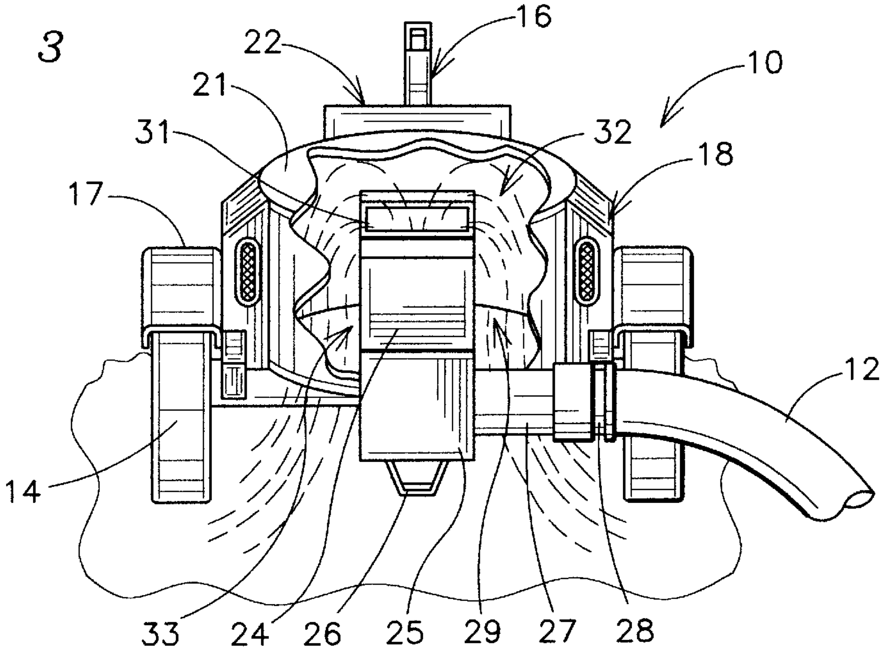
FIG. 4 is a partial perspective of the fire hydrant diffuser of FIGS. 1–3.
Figure 5:
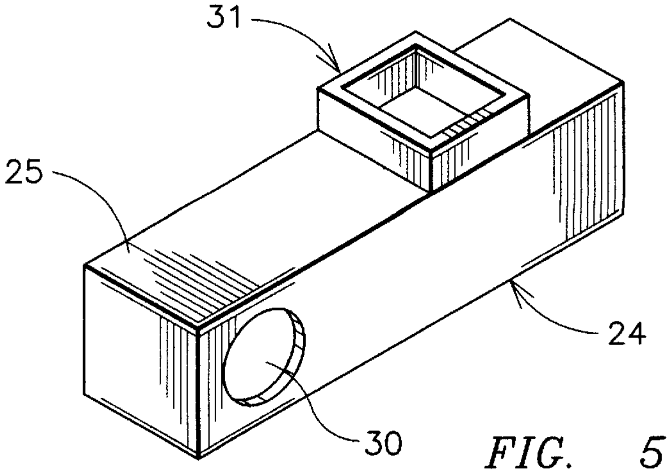
FIG. 5 is a perspective view of the walled fire hydrant diffuser passageway of the fire hydrant diffuser of FIGS. 1–4.

The walled passageway 24 can be seen in FIG. 5 as having a generally square cross section passageway having an opening 30 for the coupling 27 and a generally square opening 31 extending at right angles from the opening 30 for facing upwards in the housing 18 within the inner housing chamber 32 aimed directly at the top wall 21 of the fire hydrant diffuser 10 housing 18. An open bottom 29 and 33 open on either side of the passageway 24 from the inner chamber 32. As seen in FIG. 3, a tongue supporting arm 34 is hinged at 35 to the tongue 16 and has a foot 36 on the end thereof for supporting the tongue and the fire hydrant diffuser 10 in a generally level position when disconnected from a towing vehicle.

In operation, the wheeled hydrant diffuser 10 is attached to a vehicle which can be a fire truck but would typically be a small pickup truck or car having a trailer hitch for attaching the trailering tongue 16 where the wheeled fire hydrant diffuser 10 can be towed to a fire hydrant location. The hose 12 is removed from the storage compartment 22 and one end coupled with the coupling 28 to the diffuser passageway 24 and the other end of the hose 12 coupled with a coupling 12 to the fire hydrant 11. The fire hydrant can be opened and water allowed to flow through the fire hose into the passageway 24, which is a closed end passageway, with an egress opening 31 therein which may have a shaped square nozzle portion. Water is directed from the hydrant 11 under pressure out of the passageway 24 and into the inner chamber 32, against the interior of the top wall 21, where the water is deflected, as shown in FIG. 3. The water impinges against the wall 21, reverses direction to flush out the bottom openings 29 and 33 thereby reducing the pressure and force of the water from the fire hydrant. The water is directed onto the street to thereby prevent damage to the street, surrounding landscape, or any vehicles.

The wheeled hydrant diffuser 10, as illustrated, advantageously can be operated by a single operator and can be towed on any vehicle desired to thereby reduce the cost in man power for testing and flushing fire hydrants. It should also, however, be clear that the present invention is not limited to the forms shown and may include a different shaped passageway 24, such as a cylindrical passageway. The water directed to the inner chamber 32 may be directed through more than one opening and against any number of walls within the inner chamber 32 or against another diffuser which can be placed within the chamber 32. Accordingly, it should be clear that the present invention is not to be limited to the forms shown which are to be considered illustrative rather than restrictive.

We claim:

1. A wheeled fire hydrant diffuser apparatus comprising:

a wheeled frame having a trailering tongue for attachment to the rear of a vehicle;

a housing formed with walls and attached to said wheeled frame and having an inner chamber therein having an open bottom;

an elongated walled passageway extending through said housing inside chamber and having an opening therein facing the top of said housing;

a flexible fire hose having two ends and having one end removably coupled to said walled passageway and having a removable fire hose hydrant coupling on the other end thereof; whereby said fire hose can be connected to a fire hydrant and the fire hydrant opened to direct water therefrom through said walled passageway and into said housing inner chamber and out the open bottom of said housing inner chamber.

2. A wheeled fire hydrant diffuser apparatus in accordance with claim 1 in which said housing has a storage compartment formed therein having a cover for storing said fire hose.

3. A wheeled fire hydrant diffuser apparatus in accordance with claim 2 in which said walled passageway extends though one said housing wall and has a fire hose coupling connector on that portion of said walled passageway extending from said housing.

4. A wheeled fire hydrant diffuser apparatus in accordance with claim 3 in which said walled passageway has a generally square cross section having an opening therethrough in said housing inner chamber.

5. A wheeled fire hydrant diffuser apparatus in accordance with claim 4 in which said walled passageway has a generally square opening therethrough.

6. A wheeled fire hydrant diffuser apparatus in accordance with claim 5 in which said housing is generally cylindrical with a generally cylindrical inner chamber.

7. A wheeled fire hydrant diffuser apparatus in accordance with claim 1 in which said inner chamber has plural opening therefrom around said walled passageway.

* * * * *